(12) United States Patent (10) Patent No.: US 12,519,177 B2
Yoon et al. (45) Date of Patent: Jan. 6, 2026

(54) BATTERY CELL, AND BATTERY MODULE, BATTERY PACK AND VEHICLE INCLUDING THE SAME

(71) Applicant: LG Energy Solution, Ltd., Seoul (KR)

(72) Inventors: Kyoung-Soon Yoon, Daejeon (KR); Wan-Geun Park, Daejeon (KR); Dong-Il Shin, Daejeon (KR); Seok-Je Kim, Daejeon (KR); Yong-Tae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 598 days.

(21) Appl. No.: 17/969,322

(22) Filed: Oct. 19, 2022

(65) Prior Publication Data

US 2023/0402702 A1 Dec. 14, 2023

(30) Foreign Application Priority Data

Jun. 14, 2022 (KR) ........................ 10-2022-0072272
Sep. 29, 2022 (KR) ........................ 10-2022-0124535

(51) Int. Cl.
*H01M 50/325* (2021.01)
*H01M 50/105* (2021.01)
(Continued)

(52) U.S. Cl.
CPC ....... *H01M 50/325* (2021.01); *H01M 50/105* (2021.01); *H01M 50/178* (2021.01);
(Continued)

(58) Field of Classification Search
CPC ............. H01M 50/325; H01M 50/186; H01M 50/531; H01M 50/50
See application file for complete search history.

(56) References Cited

U.S. PATENT DOCUMENTS

2007/0202399 A1 8/2007 Shin et al.
2009/0017365 A1 1/2009 Miyahisa et al.
(Continued)

FOREIGN PATENT DOCUMENTS

EP 4009432 A1 6/2022
JP 2006147370 A 6/2006
(Continued)

OTHER PUBLICATIONS

Extended European Search Report including Written Opinion for Application No. 22946979.6 dated Jul. 3, 2025. 8 pages.

*Primary Examiner* — Kenneth J Douyette
(74) *Attorney, Agent, or Firm* — Lerner David LLP (57) ABSTRACT

Disclosed is a battery cell capable of reinforcing safety of an electrode tab and controlling an internal pressure of the battery cell, and a battery module, a battery pack and a vehicle including the same. The battery cell includes an electrode assembly including a cell body and an electrode tab coupled to at least one side of the cell body, a cell case configured to accommodate the electrode assembly therein, an electrode lead coupled to the electrode tab and extending from the cell case, a tab protection module accommodated in the cell case and configured to cover at least a portion of the electrode tab, and a venting module coupled to the tab protection module and configured discharge a venting gas out of the cell case.

18 Claims, 7 Drawing Sheets

(51) Int. Cl.
*H01M 50/178* (2021.01)
*H01M 50/186* (2021.01)
*H01M 50/531* (2021.01)

(52) U.S. Cl.
CPC ....... *H01M 50/186* (2021.01); *H01M 50/531* (2021.01); *H01M 2200/20* (2013.01); *H01M 2220/20* (2013.01)

(56) References Cited

U.S. PATENT DOCUMENTS

| | | |
|---|---|---|
| 2010/0266881 A1 | 10/2010 | You et al. |
| 2011/0086252 A1* | 4/2011 | Phillips ............... H01M 50/325 29/623.2 |
| 2011/0300437 A1* | 12/2011 | Yi ....................... H01M 50/645 429/185 |
| 2015/0072185 A1 | 3/2015 | Cho et al. |
| 2016/0020452 A1 | 1/2016 | Choi et al. |
| 2016/0036024 A1 | 2/2016 | Choi et al. |
| 2016/0315301 A1 | 10/2016 | Kim et al. |
| 2018/0114955 A1 | 4/2018 | Robert et al. |
| 2020/0328397 A1 | 10/2020 | Park |
| 2020/0343492 A1 | 10/2020 | Kato |
| 2021/0083254 A1 | 3/2021 | You et al. |
| 2022/0263192 A1 | 8/2022 | Lee et al. |
| 2022/0344754 A1 | 10/2022 | Jo et al. |
| 2023/0084670 A1 | 3/2023 | Lim et al. |

FOREIGN PATENT DOCUMENTS

| | | |
|---|---|---|
| JP | 2014107147 A | 6/2014 |
| JP | 6627399 B2 | 1/2020 |
| KR | 2007-0049553 A | 5/2007 |
| KR | 2008-0024108 A | 3/2008 |
| KR | 2008-0094602 A | 10/2008 |
| KR | 2011-0082975 A | 7/2011 |
| KR | 20140049748 A | 4/2014 |
| KR | 20160126157 A | 11/2016 |
| KR | 20190032019 A | 3/2019 |
| KR | 2019-0048069 A | 5/2019 |
| KR | 20190122055 A | 10/2019 |
| KR | 20200125495 A | 11/2020 |
| KR | 20210044099 A | 4/2021 |
| KR | 102257850 B1 | 5/2021 |
| KR | 20210075476 A | 6/2021 |
| KR | 102275273 B1 | 7/2021 |
| KR | 20210104492 A | 8/2021 |
| KR | 2022-0061853 A | 5/2022 |

* cited by examiner

BATTERY CELL, AND BATTERY MODULE, BATTERY PACK AND VEHICLE INCLUDING THE SAME

CROSS-REFERENCE TO RELATED APPLICATIONS

The present application claims priority from Korean Patent Application No. 10-2022-0072272 filed on Jun. 14, 2022, Korean Patent Application No. 10-2022-0124535 filed on Sep. 29, 2022 in the Republic of Korea, the disclosures of which is hereby incorporated herein by reference.

TECHNICAL FIELD

The present disclosure relates to a battery cell, a battery module, a battery pack and a vehicle including the same. More particularly, the present disclosure relates to a battery cell capable of reinforcing safety of an electrode tab and controlling an internal pressure of the battery cell, a battery module, a battery pack and a vehicle including the same.

BACKGROUND ART

Secondary batteries that are easily applicable to various product groups and have electrical characteristics such as high energy density are universally used not only in portable devices, but also electric vehicles (EVs) or hybrid electric vehicles (HEVs) driven by an electric drive source. These secondary batteries are attracting attention as a new energy source for improving eco-friendliness and energy efficiency due to not only the primary advantage of dramatically reducing the use of fossil fuels but also the secondary advantage of not generating by-products from the use of energy.

The types of secondary batteries currently widely used in the art include a lithium ion battery, a lithium polymer battery, a nickel cadmium battery, a nickel hydride battery, a nickel zinc battery, and the like. The operating voltage of such a unit secondary battery cell, namely a unit battery cell, is about 2.5V to 4.5V. Therefore, when a higher output voltage than this is required, a battery pack may be configured by connecting a plurality of battery cells in series. In addition, according to the charge/discharge capacity required for the battery pack, a plurality of battery cells are connected in parallel to configure a battery pack. Accordingly, the number of battery cells included in the battery pack may be arranged in various ways according to a required output voltage or charge/discharge capacity.

When a battery pack is configured by connecting a plurality of battery cells in series/parallel, in general, a battery module including at least one battery cell is configured first, and other components are added to at least one battery module to configure a battery pack.

Meanwhile, in the conventional battery cell, the periphery of an electrode tab coupled to the electrode assembly and connected to the electrode lead is surrounded only by the cell case without a separate protective structure, so the corresponding portion is vulnerable to an external force transmitted through the cell case or the electrode lead. In addition, a venting gas may be generated as a result of a thermal event in the battery cell, and due to a lack of structure in the conventional battery cell capable of properly discharging the venting gas to the outside, the cell case may be damaged.

DISCLOSURE

Technical Problem

The present disclosure is designed to solve the problems of the related art, and therefore the present disclosure is directed to providing a battery cell capable of reinforcing the safety of an electrode tab and controlling an internal pressure of the battery cell, a battery module, a battery pack and a vehicle including the same.

However, the technical object to be solved by the present disclosure is not limited to the above, and other objects not mentioned herein will be clearly understood by those skilled in the art from the following disclosure.

Technical Solution

In one aspect of the present disclosure, there is provided a battery cell, comprising: an electrode assembly including a cell body and an electrode tab coupled to at least one side of the cell body; a cell case configured to accommodate the electrode assembly therein; an electrode lead coupled to the electrode tab and extending from the cell case; a tab protection module accommodated in the cell case and configured to cover at least a portion of the electrode tab; and a venting module coupled to the tab protection module and configured to discharge a venting gas out of the cell case.

In some examples, the tab protection module may include a venting passage, the cell case may include a venting hole positioned to be in communication with the venting passage, and the venting module may be configured to open and close communication between the venting passage and the venting hole according to a change in the internal pressure of the cell case.

In some examples, the venting module may include a valve configured to open or close the venting passage according to the change in the internal pressure of the cell case; a support member including a venting guide unit having a hole positioned to be in communication with the venting passage and the venting hole; and an elastic member disposed between the valve and the support member configured to transition between an elastically compressed state and an elastically expanded state.

In some examples, the venting guide unit may be configured to at least partially protrude out of the cell case through the venting hole.

In some examples, the venting module may further include a sealing member disposed between an inner surface of the cell case and the support member, the sealing member configured to seal a space between the venting guide unit and the venting hole.

In some examples, the sealing member may be configured to surround an outer circumference of the venting guide unit.

In some examples, the tab protection module may include a seating groove configured to interface with the support member.

In some examples, the support member may include a coupling hole configured to be coupled to the tab protection module with a coupling member.

In some examples, the venting module may further include a buffer member provided at an inlet of the venting passage and configured to contact the valve when the internal pressure of the cell case decreases to or below a threshold pressure from a pressure above the threshold pressure.

In some examples, the tab protection module may be configured to have a shape corresponding to an inner surface of the cell case facing the tab protection module.

In some examples, a coupling portion coupling the electrode tab and the electrode lead may be located within the tab protection module.

In some examples, at least a portion of the tab protection module is in close contact with the cell body.

In some examples, the tab protection module may be disposed between an inner surface of the cell case and the electrode assembly, a first end of the tab protection module may be positioned at a first side of the electrode assembly, a second end of the tab protection module may be positioned at a coupling portion coupling the electrode tab and the electrode lead, and the electrode tab may be configured to be at least partially surrounded by the tab protection module between the first end of the tab protection module and the second end of the tab protection module.

In some examples, the coupling portion coupling the electrode tab and the electrode lead may be located within the tab protection module.

In some examples, the tab protection module may define a shape corresponding to an inner surface of the cell case.

In some examples, the tab protection module may be provided on at least one side of the cell body and configured to at least partially cover an upper side and a lower side of the electrode tab.

In some examples, the cell case may define a first hold and the venting module may define a second hold configured to communicate with the first hole to allow gas to exit the cell case.

Also, in another aspect of the present disclosure, there is also provided a battery module, comprising at least one battery cell according to an aspect of the present disclosure.

Also, in another aspect of the present disclosure, there is also provided a battery pack, comprising at least one battery module according to an aspect of the present disclosure.

Also, in another aspect of the present disclosure, there is also provided a vehicle, comprising at least one battery pack according to an aspect of the present disclosure.

Advantageous Effects

According to an embodiment of the present disclosure, when an impact occurs outside the battery cell, it is possible to prevent the structurally weak electrode tab from being separated and damaged, and simultaneously to guide the venting gas to be discharged to the outside of the cell case at a portion where the tab protection module is disposed. Therefore, according to the present disclosure, it is possible to prevent the venting gas from being discharged randomly from the cell case out of unexpected parts of the cell case, and to instead induce the venting gas to be discharged to the outside of the cell case by concentrating the flow of the venting gas through the portion where the tab protection module is disposed.

Moreover, according to various embodiments of the present disclosure, several other additional effects may be achieved. Various effects of the present disclosure will be described in detail in each embodiment, or any effects that can be easily understood by those skilled in the art will not be described in detail.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
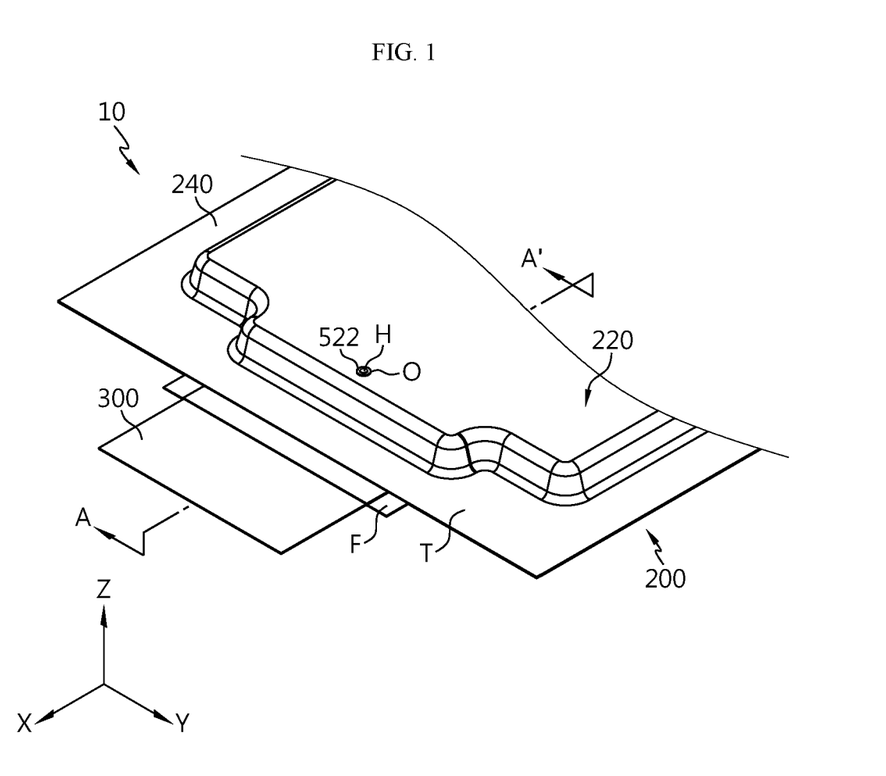
FIG. 1 is a diagram showing a battery cell according to an embodiment of the present disclosure.
Figure 2:
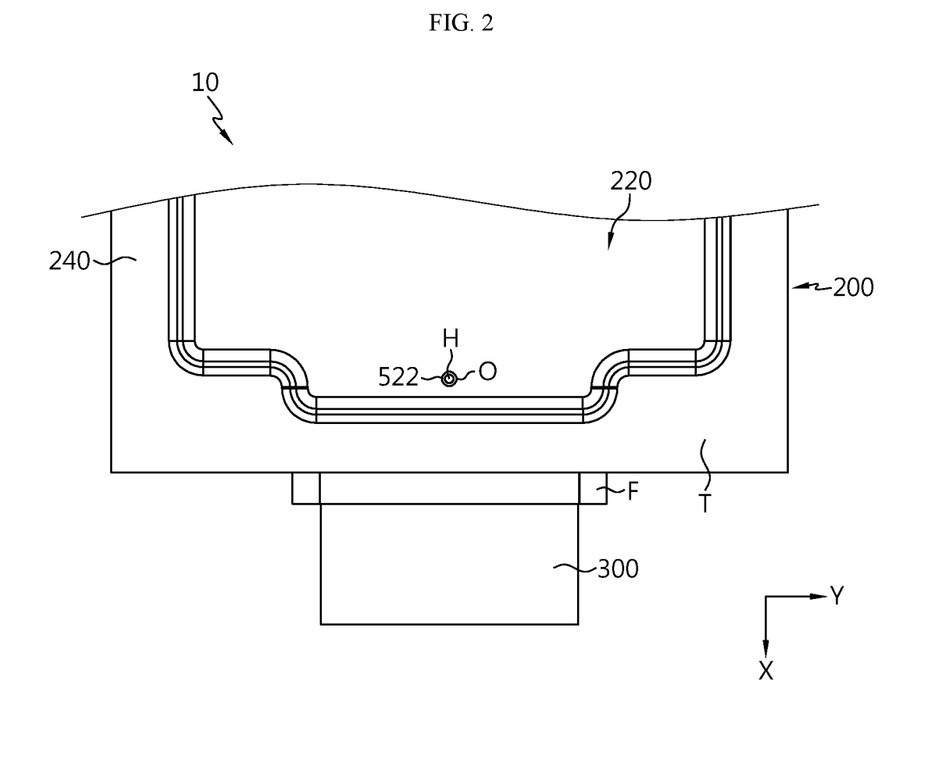
FIG. 2 is a diagram showing the battery cell of FIG. 1, viewed from the above.
Figure 3:
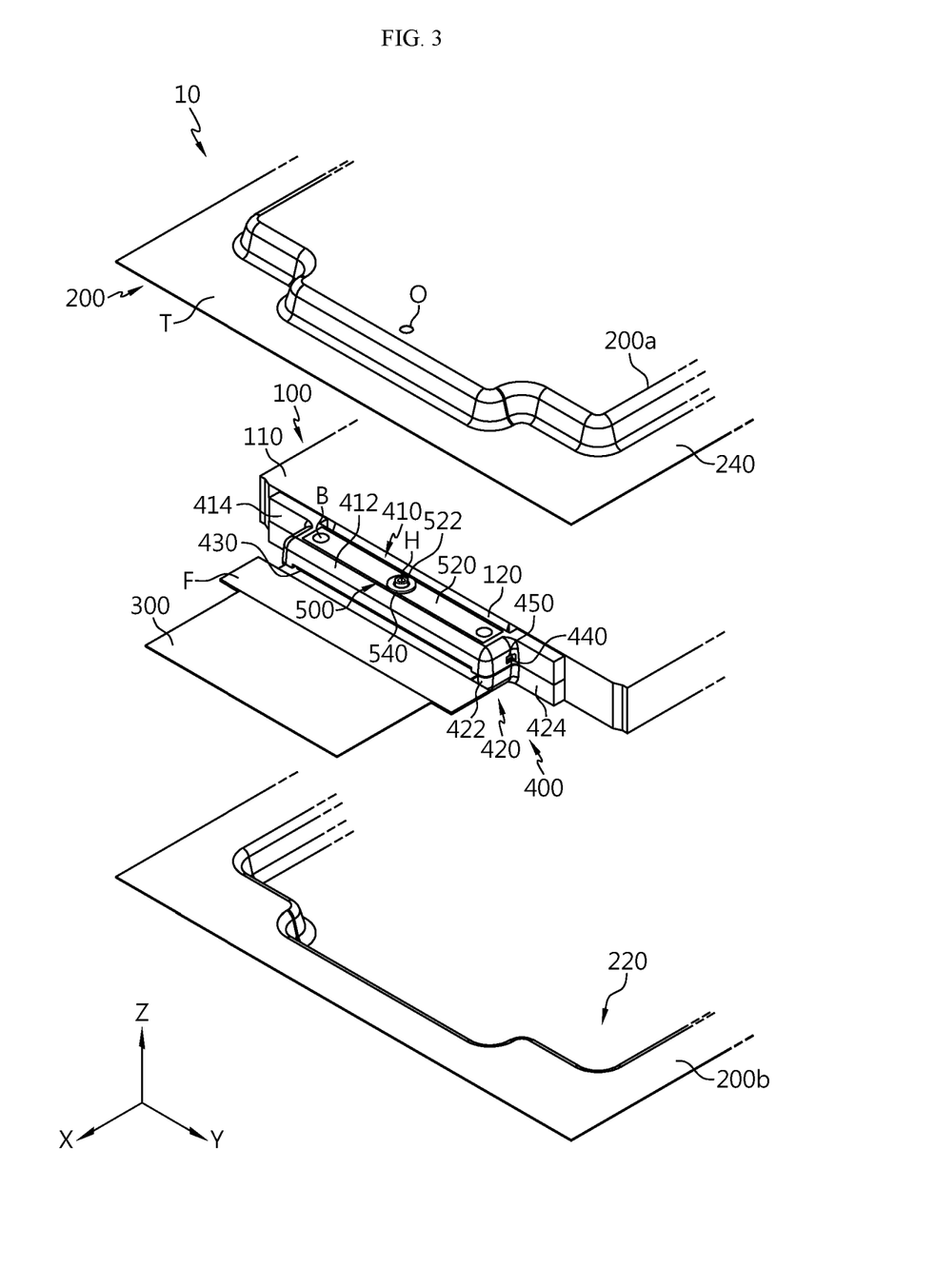
FIG. 3 is a partially exploded perspective view showing the battery cell of FIG. 1.
Figure 4:
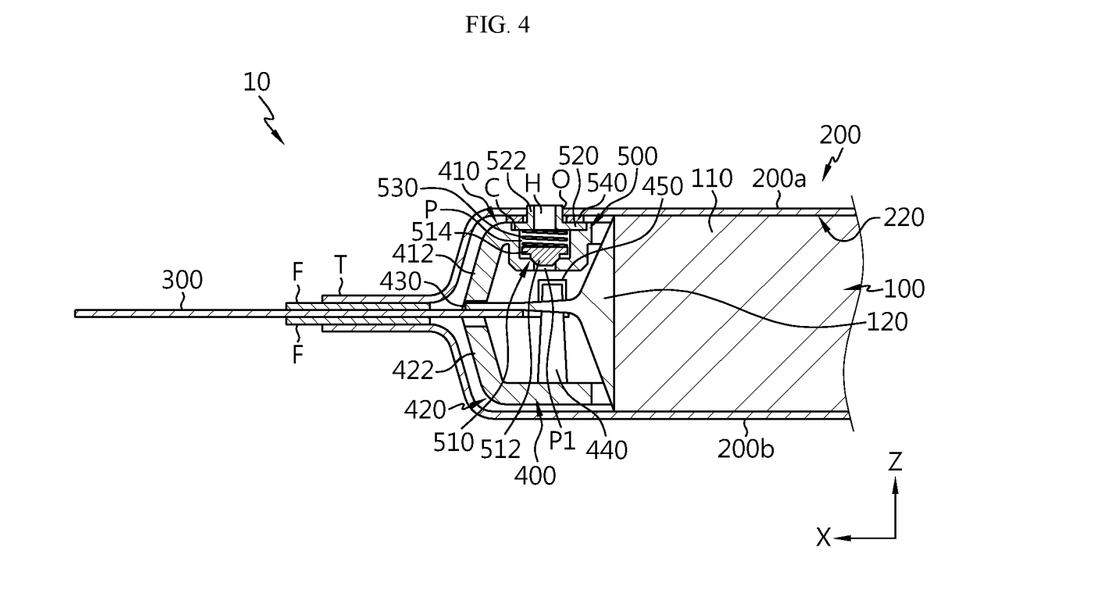
FIG. 4 is a cross-sectional view, taken along in the line A-A' of FIG. 1.

FIG. 1 is a diagram showing a battery cell 10 according to an embodiment of the present disclosure, FIG. 2 is a diagram showing the battery cell 10 of FIG. 1, viewed from the above, FIG. 3 is a partially exploded perspective view showing the battery cell 10 of FIG. 1, and FIG. 4 is a cross-sectional view, taken along in the line A-A' of FIG. 1.

In an embodiment of the present disclosure, the X-axis direction shown in the drawings may mean a longitudinal direction of the battery cell 10, the Y-axis direction may mean a left and right direction of the battery cell 10 perpendicular to the X-axis direction on the horizontal plane (XY plane), and the Z-axis direction may mean an upper and lower direction perpendicular to both the X-axis direction and the Y-axis direction.

Referring to FIGS. 1 to 4, the battery cell 10 according to an embodiment of the present disclosure may include an electrode assembly 100, a cell case 200, an electrode lead 300, a tab protection module 400, and a venting module 500.

The battery cell 10 may be a secondary battery. The battery cell 10 may be a pouch-type battery cell.

The electrode assembly 100 may include a cell body 110 and an electrode tab 120.

Although not shown in detail, the electrode assembly 100 may include a first electrode plate having a first polarity, a second electrode plate having a second polarity, and a separator interposed between the first electrode plate and the second electrode plate. As an example, the first electrode plate may be a positive electrode plate coated with a positive electrode active material or a negative electrode plate coated with a negative electrode active material, and the second electrode plate may correspond to an electrode plate having a polarity opposite to that of the first electrode plate.

The electrode tab 120 may be at least a part of an uncoated portion where a positive electrode active material or a negative electrode active material is not applied. The uncoated portion may be a portion protruding from the first electrode plate or the second electrode plate of the electrode assembly 100. Specifically, the electrode tab 120 may be formed by gathering portions processed by a notching process among the uncoated portion. The cell body 110 may be defined as a portion other than the electrode tab 120 in the electrode assembly 100.

Meanwhile, in the present disclosure, the electrode tab 120 is not limited to at least a part of the uncoated portion. That is, the electrode tab 120 may be separately provided and coupled to the uncoated portion.

The cell body 110 may be defined as a portion of the electrode assembly 100 other than the electrode tab 120. The electrode tab 120 may be provided to at least one of both sides of the cell body 110.

The cell case 200 may accommodate the electrode assembly 100 therein. That is, the cell case 200 may have an accommodation space for accommodating the electrode assembly 100 therein. The cell case 200 accommodates an electrolyte therein, and the cell case 200 accommodates the electrode assembly 100 in a state where the electrode assembly 100 is loaded with the electrolyte. As an example, the cell case 200 may include a pouch film including a layer of a metal material (e.g., aluminum (Al)), but is not limited thereto.

The electrode lead 300 may extend from or out of the cell case 200 by a predetermined length. The electrode lead 300 may be provided in a pair, and the pair of electrode leads 300 may be provided on either side of the cell case 200, respectively, or may be provided on only one side. In addition, a lead film F for sealing the cell case 200 and the electrode lead 300 to each other may be interposed between the cell case 200 and the electrode lead 300. As an example, the lead film F may be provided as a heat-fusing film to increase the sealing force of the area of the cell case 200 where the electrode lead 300 is disposed. In addition, the lead film F may be configured to include an insulating material to prevent a short circuit of the electrode lead 300.

In addition, the electrode lead 300 may be connected to the electrode assembly 100 inside the cell case 200 through the electrode tab 120. As an example, the electrode lead 300 may be coupled to the electrode tab 120 by welding or the like.

The tab protection module 400 may be accommodated in the cell case 200 and configured to cover at least a part of the electrode tab 120. As an example, the tab protection module 400 may be configured to include an insulating material. Accordingly, it is possible to minimize the occurrence of a short circuit in the cell body 110, the electrode tab 120 and the electrode lead 300 as the tab protection module 400 comes into contact with the cell body 110, the electrode tab 120, the electrode lead 300, and the like.

The electrode tab 120 described above may have a relatively small thickness compared to the cell body 110. Therefore, the electrode tab 120 may be vulnerable to an impact caused by an external force transmitted to the cell case 200 from the outside. By covering the electrode tab 120, the tab protection module 400 may receive an impact caused by an external force or the like transmitted to the cell case 200 from the outside, which is more preferable than the impact being received by the electrode tab 120. It should also be noted that the electrode tab 120 may further be at risk of receiving an internal force caused by the expansion and contraction of the electrode assembly caused by the charging and discharging of the electrode. An additional benefit of the tab protection module 400 is to absorb such internal forces from the electrode and maintain the integrity of the electrode lead 300.

In addition, an event such as a thermal runaway phenomenon may occur in battery cell 10 as described in the present disclosure. In this case, a high-temperature and high-pressure venting gas may be generated inside the cell case 200. Meanwhile, in the present disclosure, since the tab protection module 400 described above is accommodated inside the cell case 200 while forming a predetermined inner space, the volume inside the cell case 200 may be further increased, and thus it is possible to prevent the internal pressure from rapidly increasing due to the venting gas generated inside the cell case 200. In other words, because the cell case 200 is a pouch that is generally formed of a flexible material, the presence of the tab protection module 400 fills up a greater amount of space inside the pouch and expands the pouch further outward relative to an assembly lacking a tab protection module. With the perimeter of the cell case 200 expanded further outward, the volume inside the cell case is increased, and a greater interior volume reduces the speed at which the internal pressure of the cell case can increase due to the gaseous build-up. Accordingly, it is possible to effectively delay the time when a certain region of the cell case 200 is damaged and the venting gas is discharged to the outside of the cell case 200.

The venting module 500 is provided on the tab protection module 400, and may be configured to guide the venting gas to be discharged to the outside of the cell case 200 as the internal pressure of the cell case 200 increases. That is, the venting module 500 may guide the venting gas to be discharged to the outside of the cell case 200 through the tab protection module 400 when high-temperature and high-pressure venting gas is generated inside the cell case 200. To this end, the venting module 500 may be configured to allow communication between the outside of the cell case 200 and the inside of the cell case 200 as the internal pressure of the cell case 200 increases. The detailed configuration of the venting module 500 will be described in more detail later.

According to this embodiment of the present disclosure, when an impact occurs to the outside of battery cell 10, it is possible to prevent the structurally weak electrode tab 120 from being separated or damaged, and simultaneously to guide the venting gas to be discharged to the outside of the cell case 200 at the portion where the tab protection module 400 is disposed. Therefore, according to the present disclosure, it is possible to prevent the venting gas from being randomly discharged from the cell case 200 out of unexpected portions of the cell case 200, and to guide the venting gas to be discharged to the outside of the cell case 200 in a state where the flow of the venting gas is concentrated through the portion where the tab protection module 400 is disposed.

Meanwhile, the tab protection module 400 may absorb an impact caused by an external force transmitted to the cell case 200 from the outside. In addition, the tab protection module 400 may be configured to disperse the impact absorbed in this way to a plurality of regions of the electrode assembly 100. Accordingly, the impact applied to the electrode tab 120 may be reduced or minimized.

In addition, the tab protection module 400 may be configured to cover at least a part of the electrode tab 120 so that a predetermined space is formed between the electrode tab 120 and the inner surface of the cell case 200. Accordingly, it is possible to minimize an impact caused by an external force transmitted to the cell case 200 from the outside from being transmitted to the electrode tab 120.

Hereinafter, the battery cell 10 of the present disclosure will be described in more detail.

Referring to FIGS. 3 and 4, the tab protection module 400 may be configured to have a shape corresponding to the inner surface of the cell case 200 facing the tab protection module 400. According to this embodiment, the tab protection module 400 may more effectively buffer the impact caused by an external force transmitted to the cell case 200 from the outside. Accordingly, the impact applied to the electrode tab 120 may be minimized. In addition, through this shape structure, the tab protection module 400 may be accommodated inside the cell case 200 without causing a shape deformation of the cell case 200. In particular, the venting module 500 may be provided on the tab protection module 400 so that a part thereof faces the inner surface of the cell case 200. Accordingly, through the shape structure corresponding to the inner surface of the cell case 200 facing the tab protection module 400, the venting gas may be guided more stably to be discharged to the outside of the cell case 200 through the venting module 500.

Specifically, the cell case 200 may include an accommodation portion 220 and a sealing portion 240.

The accommodation portion 220 may be configured to accommodate or hold the electrode assembly 100 therein.

The sealing portion 240 may have a shape extending outward by a predetermined length from the periphery of the accommodation portion 220.

Meanwhile, the cell case 200 may include a first case member 200a and a second case member 200b. Peripheral regions of the edges of the first case member 200a and the second case member 200b may come into contact with each other and be coupled by thermal fusion to form the sealing portion 240 described above. In addition, a space is formed inside the sealing portion 240 by the separation between the first case member 200a and the second case member 200b, and this space may serve as the accommodation portion 220 described above.

In addition, the sealing portion 240 may include a case terrace T. The case terrace T may refer to a region located in a direction along which the electrode lead 300 extends from the cell case 200, among the entire region of the sealing portion 240.

That is, the case terrace T may be configured to extend by a predetermined length from the accommodation portion 220 and to support the electrode lead 300. It is thus possible to seal the electrode lead 300 and the cell case 200 to each other through the lead film F described above. Specifically, the lead film F may be interposed between the electrode lead 300 and the case terrace T.

The tab protection module 400 described above may have a shape corresponding to the inner surface of the accommodation portion 220 adjacent to the case terrace T. In this case, regions of the accommodation portion 220 and the case terrace T adjacent to each other may be structurally weak due to the shape of the bent structure or the like.

In the embodiment of the present disclosure, since the tab protection module 400 may be accommodated in the accommodation portion 220 while having a shape corresponding to the inner surface of the accommodation portion 220 adjacent to the case terrace T, the rigidity of the adjacent regions of the accommodation portion 220 and the case terrace T may be reinforced. Accordingly, the tab protection module 400 may enhance the structural rigidity of the cell case 200 further by reinforcing the rigidity of the structurally weak region in the cell case 200. That is, the accommodation portion 220 of the cell case 200 is shaped specifically to fit the tab protection module 400 so that there when the battery cell 10 is fully assembled, there is little to no space between the accommodation portion 220 and the tab protection module 400. The combination of components forms a tight stack of layers which prevents the tab protection module 400, and thus the electrode tab 120, from bouncing around upon receipt of an external impact.

Referring to FIGS. 3 and 4, the coupling portion between the electrode tab 120 and the electrode lead 300 may be configured to be located in the inner space of the tab protection module 400. In other words, the tab protection module 400 may define a space therewithin, e.g., the inner space, and within that inner space, the electrode tab 120 may be coupled to the electrode lead 300.

In some examples, the entire area of the coupling portion between the electrode tab 120 and the electrode lead 300 may be configured to be located in the inner space of the tab protection module 400. Accordingly, the damage to the electrode tab 120 may be minimized, and the connection between the electrode tab 120 and the electrode lead 300 may be stably maintained.

Meanwhile, since the electrode lead 300 is interposed between one side (e.g., upper side) and the other side (e.g., lower side) of the case terrace T, the part of the case terrace T supporting the electrode lead 300 may be structurally weak compared to the other part of the cell case 200.

The tab protection module 400 described above may reinforce the rigidity of the adjacent areas of the accommodation portion 220 and the case terrace T. In addition, since the venting module 500 described above is provided on the tab protection module 400, it is possible to minimize the discharge of the venting gas through a region where the electrode lead 300 is located or a region adjacent thereto in the cell case 200. Specifically, according to the present disclosure, since the venting gas may be discharged to the outside of the cell case 200 in a state where the flow of the venting gas is concentrated through the portion where the tab protection module 400 is disposed, it is possible to prevent the venting gas from being discharged in an unpredictable direction or from an unpredictable portion of the cell case 200 since the structurally weak part, namely the portion of the case terrace T supporting the electrode lead 300, may be unevenly broken as the internal pressure increases. In other words, the case terrace T may be structurally weaker than other parts of the cell case 200, and as a result, the case terrace T may be subject to breaking apart if the venting gas were to build up to create an excessive internal pressure because the cell gas 200 lacked an effective means of releasing the gas. However, the venting module 500 of the tab protection module 400 may allow for such an effective means of releasing the gas to avoid undesired pressure on the cell case 200, and namely the case terrace T.

Figure 5:
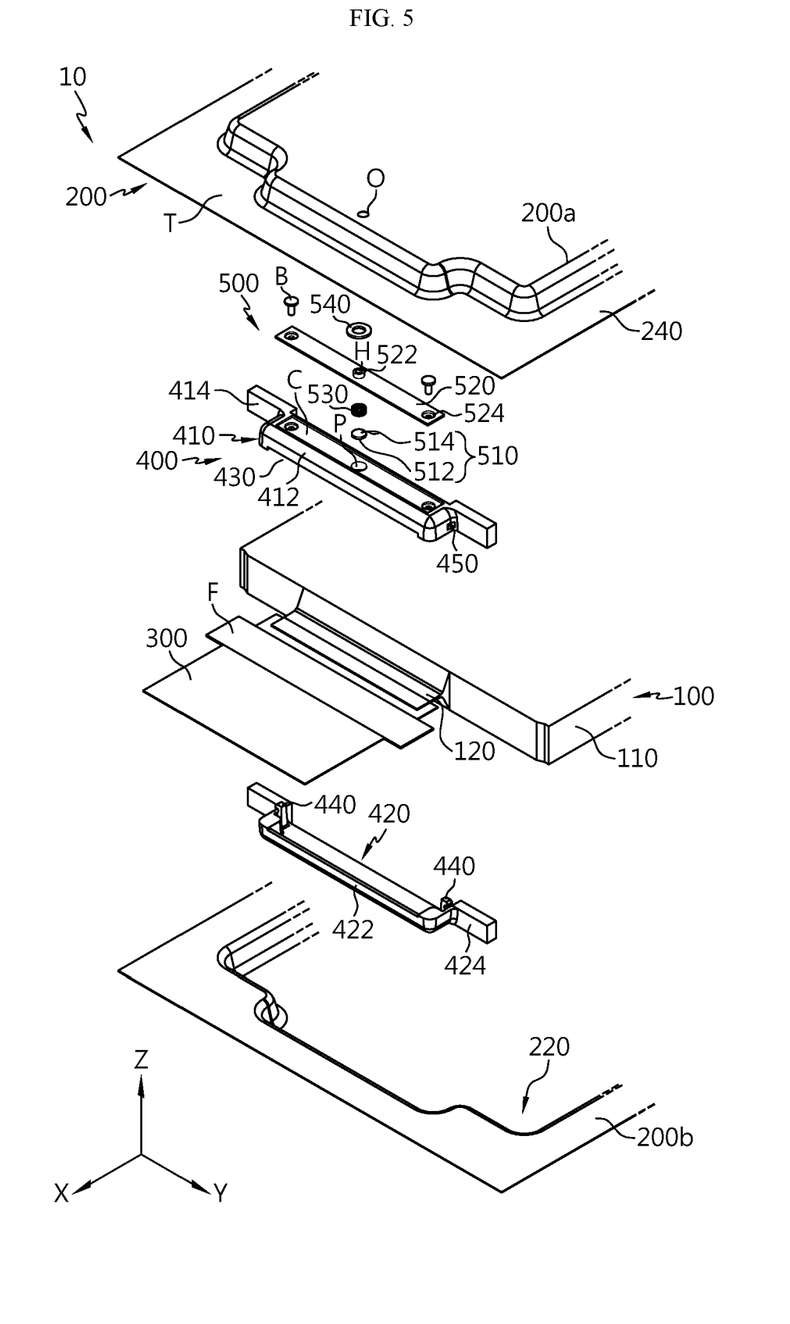
FIG. 5 is an entire exploded perspective view of the battery cell of FIG. 1.

FIG. 5 is an entire exploded perspective view of the battery cell 10 of FIG. 1.

Referring to FIGS. 3 to 5, the tab protection module 400 may be provided on at least one side of the cell body 110 described above. In this state, the tab protection module 400 may at least partially cover upper and lower sides of the electrode tab 120. The tab protection module 400 may be provided on one side of the cell body 110 to cover most of the upper and lower sides of the electrode tab 120 on that one side of the cell body 110.

Specifically, the tab protection module 400 may include a first protection cap 410 and a second protection cap 420.

The first protection cap 410 may be provided on at least one side of the cell body 110. In addition, the first protection cap 410 may at least partially cover the upper side of the electrode tab 120.

The first protection cap 410 may include a first cap body 412 and a first cap wing 414.

The first cap body 412 may at least partially cover the upper side of the electrode tab 120. In addition, the first cap body 412 may be configured to have a shape corresponding to the inner surface of the cell case 200 facing the first cap body 412.

The first cap wing 414 may be configured to extend from both ends of the first cap body 412. The first cap wing 414 may be configured to cover one side of the cell body 110 at the portions of that side of the cell body 110 along which the electrode tab 120 is not positioned. In other words, the electrode tab 120 may extend from a side of the cell body 110, and the first cap wing 414 may be positioned on that same side of the cell body 110 as the electrode tab 120, but may cover a portion of that side of the cell body 110 adjacent to the electrode tab 120, e.g., where the electrode tab 120 is not located.

The second protection cap 420 may be provided to at least one side of the cell body 110. In addition, the second protection cap 420 is connected to the first protection cap 410 in the upper and lower direction, and may at least partially cover the lower side of the electrode tab 120.

The second protection cap 420 may include a second cap body 422 and a second cap wing 424.

The second cap body 422 may at least partially cover the lower side of the electrode tab 120. In addition, the second cap body 422 may be configured to have a shape corresponding to the inner surface of the cell case 200 facing the second cap body 422.

The second cap wing 424 may be configured to extend from both ends of the second cap body 422. The second cap wing 424 may be configured to cover one side of the cell body 110 at the portions of that side of the cell body 110 along which the electrode tab 120 is not positioned. In other words, the electrode tab 120 may extend from a side of the cell body 110, and the second cap wing 424 may be positioned on that same side of the cell body 110 as the electrode tab 120, but may cover a portion of that side of the cell body 110 adjacent to the electrode tab 120, e.g., where the electrode tab 120 is not located.

The first protection cap 410 and the second protection cap 420 may be assembled with each other in the upper and lower direction of the electrode tab 120 to at least partially surround the electrode tab 120.

Accordingly, it is possible to minimize that an impact caused by an external force transmitted through the cell case 200 from the outside is transmitted to the electrode tab 120. In addition, since an impact caused by an external force transmitted to the cell case 200 from the outside may be dispersed even in an area of the cell body 110 where the electrode tab 120 is not positioned, the impact applied to the electrode tab 120 may be further minimized.

Referring to FIGS. 3 to 5 again, the tab protection module 400 may be configured such that at least a part thereof is in close contact with the cell body 110.

Specifically, the first cap wing 414 of the first protection cap 410 and the second cap wing 424 of the second protection cap 420 may be configured to be in close contact with one side of the cell body 110 at a portion(s) of the cell body 110 at which the electrode tab 120 is not positioned. Accordingly, an impact caused by an external force transmitted from the outside to the cell case 200 may be more reliably dispersed to the entire cell body 110, and thus the impact applied to the electrode tab 120 may be further minimized. That is, because the first cap wing 414 and the second cap wing 424 are adjacent to the parts of the cell body 200 surrounding the electrode tab 120, the wings are adapted to disperse an external force to the outer portions of the cell body 200 rather than the electrode tab 120.

In addition, a part of the tab protection module 400 is in close contact with one side of the cell body 110 at portions of the cell body 110 where the electrode tab 120 is not positioned, and the flow of the venting gas may be more concentrated into the tab protection module 400. That is, due to the presence of the venting module 500 and the ability of the cell body 110 to release the venting gas through the venting module 500 more easily than any other part of the battery cell 10, the flow of the venting gas will follow the path of least resistance by passing through the tab protection module 400 and out the venting module 500. Accordingly, since the flow of the venting gas is more concentrated on the venting module 500 provided on the tab protection module 400, the venting gas may be induced to be discharged to the outside of the cell case 200.

Hereinafter, the venting module 500 of the present disclosure will be described in more detail.

Figure 6:
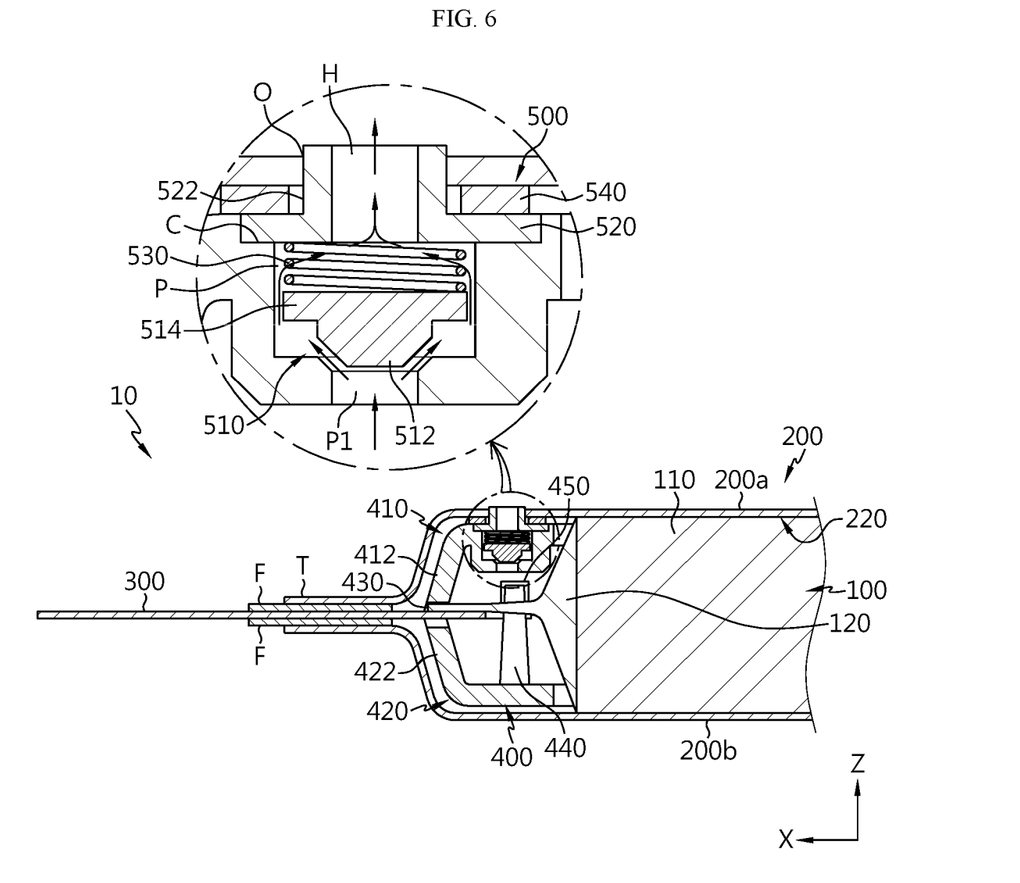
FIG. 6 is a diagram showing a state where a venting gas is discharged to the outside of the cell case as the internal pressure of the battery cell of FIG. 1 increases.

FIG. 6 is a diagram showing a state where a venting gas is discharged to the outside of the cell case 200 as the internal pressure of the battery cell 10 of FIG. 1 increases.

Referring to FIGS. 3 to 6, the tab protection module 400 may include a venting passage P. In addition, the cell case 200 may have a venting hole O provided at a location corresponding to the venting passage P. That is, venting hole O may be positioned so as to be in communication with venting passage P as described below in further detail.

As an example, the venting passage P may have a hollow channel communicating with the inside and outside of the cell case 200. The venting passage P may be provided on the first cap body 412 of the first protection cap 410 described above, but is not limited thereto, and may also be provided to the second cap body 422 of the second protection cap 420.

In addition, the venting hole O may have a predetermined area to correspond to an outlet of the venting passage P (the region of the venting passage P facing the outside of the cell case 200). The venting hole O may be provided on the first case member 200a described above, but is not limited thereto, and may also be provided to the second case member 200b.

The venting module 500 may be configured to provide communication between the venting passage P and the venting hole O according to the change in the internal pressure of the cell case 200, or to block the communication between the venting passage P and the venting hole O.

That is, a part of the venting module 500 may be provided in the venting passage P. In addition, when the internal pressure of the cell case 200 increases, the venting module 500 may guide the venting gas to be discharged to the outside of the cell case 200 by opening the venting passage P. In addition, when the internal pressure of the cell case 200 decreases, the venting module 500 may block the inflow of oxygen or other gases into the cell case 200 by closing the venting passage P.

According to this embodiment of the present disclosure, by the venting module 500 that controls the communication between the venting hole O and the venting passage P, the venting gas may be more stably discharged to the outside of the cell case 200 through the portion where the tab protection module 400 is disposed. In addition, when the venting gas is discharged to the outside of the cell case 200 so that the internal pressure of the cell case 200 decreases, the inflow of oxygen into the cell case 200 is minimized or prevented by closing the venting passage P, thereby reducing the possibility of a fire inside the battery cell 10.

Referring to FIGS. 3 to 6 again, the venting module 500 may include a valve 510, a support member 520, and an elastic member 530.

The valve 510 may be configured to open and close the venting passage P according to the change in the internal pressure of the cell case 200. The valve 510 may be provided in the venting passage P described above.

In addition, the valve 510 may include a first portion 512 and a second portion 514.

The first portion 512 is provided in the venting passage P, and may be provided in such a shape that at least a part thereof corresponds to the communication hole P1 that communicates with the inside of the tab protection module 400. In particular, at least a part of the first portion 512 may be formed in a tapered shape. In other words, the first portion 512 is sized and shaped to fit within the communication hole P1 to plug the communication hole P1 and prevent gas or air from flowing therethrough.

The second portion 514 may be connected to the first portion 512 and disposed closer to the venting hole O than the first portion 512. In addition, the second portion 514 may be provided in a shape more protruding (e.g., wider) than the first portion 512 in a radial direction.

The support member 520 may include a venting guide unit 522. The venting guide unit 522 may have a hole H provided at a location corresponding to the venting passage P and the venting hole O. That is, venting guide unit 522 may be sized to fit within and pass through venting hole O, and hole H may be defined within support member 520 and venting guide unit 522. Through the hole H of the venting guide unit 522, when the internal pressure of the cell case 200 increases, the venting gas may be discharged to the outside of the cell case 200.

The elastic member 530 may be disposed between the valve 510 and the support member 520 in an elastically compressed state. As an example, the elastic member 530 may provide a predetermined elastic force to the valve 510 according to the change in internal pressure of the cell case 200.

This elastic member 530 may be provided in the venting passage P. In particular, one side of the elastic member 530 may be disposed at the support member 520, and the other side of the elastic member 530 may be disposed at the valve 510.

Specifically, the valve 510 may close the venting passage P by the elastic force of the elastic member 530 in a state where a thermal runaway phenomenon does not occur at the battery cell 10, e.g., when there is not a sufficient amount of gas present within the battery cell 10 to produce a pressure that overcomes the force of the elastic member 530.

Meanwhile, the valve 510 may move toward the venting hole O when a venting gas is generated inside the cell case 200 according to the thermal runaway of the battery cell 10 and the internal pressure of the cell case 200 increases above a criterion or threshold pressure. In this case, the pressing force applied to the valve 510 from the inside of the cell case 200 by the venting gas may increase higher than the elastic restoring force of the elastic member 530, which is applied in a direction in which the elastic member 530 wants to stretch or extend when in a compressed state. Accordingly, when thermal runaway occurs at the battery cell 10, the valve 510 may be moved in a direction to further compress the elastic member 530. With this configuration, the venting passage P and the venting hole O may communicate, and the venting gas may be discharged to the outside of the cell case 200 through the space formed between the first portion 512 of the valve 510 and the inner surface of the venting passage P.

Accordingly, the venting gas may be quickly discharged to the outside of the cell case 200 through the communication between the venting passage P and the venting hole O. In addition, after the discharge of the venting gas, the internal pressure of the cell case 200 may be rapidly lowered.

In addition, the valve 510 may be configured to close the venting passage P when the venting gas is discharged to the outside of the cell case 200 and the internal pressure of the cell case 200 is lowered below the criterion or threshold pressure. A situation in which the internal pressure of the cell case 200 is equal to or less than the threshold pressure as described above may indicate a situation in which the venting gas has been discharged to the outside of the cell case 200 so that the elastic restoring force of the elastic member 530 to expand in a direction of pushing the valve 510 is greater than the force applied to the valve 510 by the internal pressure of the cell case 200. In this case, the elastic member 530 may be restored to its initial state. Therefore, if the venting gas is discharged to the outside and the internal pressure of the cell case 200 is lowered, the valve 510 may be moved toward the communication hole P1 of the venting passage P to close the venting passage P.

In particular, the venting guide unit 522 may be configured such that at least a part thereof protrudes to the outside of the cell case 200 through the venting hole O of the cell case 200. That is, an outlet of the hole H of the venting guide unit 522 may protrude compared to the region of the cell case 200 where the venting hole O is formed.

Accordingly, in the state in which the venting gas is discharged to the outside of the cell case 200 through the outlet of the hole H of the venting guide unit 522 protruding to the outside, it is possible to restrict the venting gas from flowing back to the inside of the cell case 200 through the space between the venting hole O and the venting guide unit 522.

Referring to FIGS. 4 to 6 again, the venting module 500 may further include a sealing member 540.

The sealing member 540 may be disposed between the inner surface of the cell case 200 and the support member 520. In addition, the sealing member 540 may be configured to seal the space formed between the venting guide unit 522 and the venting hole O. The sealing member 540 may be disposed between the inner surface of the first case member 200a and the support member 520, but is not limited thereto, and may also be provided between the inner surface of the second case member 200b and the support member 520.

As an example, the sealing member 540 may be a hot-melt sealing, but is not limited thereto.

According to this embodiment, when the internal pressure of the cell case 200 increases, the venting gas may be discharged to the outside of the cell case 200 only through the venting passage P of the tab protection module 400. Accordingly, it is possible to more stably prevent the venting gas from being discharged randomly from the cell case 200 through an unexpected or undesired portion of the cell case 200, and to more stably induce the venting gas to be discharged through the portion where the tab protection module 400 is disposed.

In particular, the sealing member 540 described above may be configured to surround the outer circumference of the venting guide unit 522. That is, the sealing member 540 may be configured to surround the entire outer circumference of the venting guide unit 522 between the inner surface of the cell case 200 and the support member 520.

According to this embodiment, it is possible to more reliably guide the venting gas to be discharged through the portion where the tab protection module 400 is disposed.

Referring to FIGS. 3 to 6 again, the tab protection module 400 may further include a seating groove C.

The support member 520 may be disposed at the seating groove C. In addition, the seating groove C may be provided on the first cap body 412 of the first protection cap 410 described above, but is not limited thereto, and may also be provided to the second cap body 422 of the second protection cap 420. In addition, the seating groove C may be formed to be recessed by a predetermined depth at the outer surface of the tab protection module 400.

According to this embodiment, the support member 520 including the venting guide unit 522 may be stably seated on the tab protection module 400. Accordingly, when the internal pressure of the cell case 200 increases, there is an advantage that the venting gas may be discharged more stably.

Referring to FIGS. 3 to 6 again, the support member 520 may further include a coupling hole 524.

The coupling hole 524 may be configured to be coupled to the tab protection module 400 through a coupling member B. As an example, the coupling member B may be a bolt, nail, screw, peg, or the like, but is not limited thereto.

In an embodiment, the coupling hole 524 may be formed in at least a part of an edge of the support member 520. In addition, the coupling member B may be inserted into the coupling hole 524 to fix the support member 520 to the first cap body 412 of the first protection cap 410. Meanwhile, the coupling member B is not limited to the former embodiment, and may be inserted into the coupling hole 524 to fix the support member 520 to the second cap body 422 of the second protection cap 420.

According to this embodiment, the support member 520 including the venting guide unit 522 may be more stably fixed to the tab protection module 400. Accordingly, when the internal pressure of the cell case 200 increases, there is an advantage that the venting gas may be discharged more stably.

Hereinafter, other components of the tab protection module 400 described above will be described.

Referring to FIGS. 3 to 5, the first protection cap 410 and the second protection cap 420 may be coupled to each other through hook-coupling. Through the hook-coupling, the first protection cap 410 and the second protection cap 420 may be coupled in an easier and simpler way.

Specifically, any one of the first protection cap 410 and the second protection cap 420 may have a fastening hook 440 for the hook-coupling. In addition, the other of the first protection cap 410 and the second protection cap 420 may have a hook groove 450 into which the fastening hook 440 is fitted.

As an example, the fastening hook 440 may be formed in a pair and provided on the second protection cap 420. The pair of fastening hooks 440 may protrude from both sides of the second cap body 422 by a predetermined length.

In addition, the hook groove 450 may be formed in a pair to correspond to the fastening hooks 440 and provided on the first protection cap 410. The pair of hook grooves 450 may be formed in a groove shape capable of fixing the end of the fastening hook 440 at both sides of the first cap body 412.

Meanwhile, in the tab protection module 400, the position where the fastening hook 440 and the hook groove 450 are formed is not limited to the above embodiment, and it is also possible that the fastening hook 440 is provided on the first protection cap 410 and the hook groove 450 is provided on the second protection cap 420.

Referring to FIGS. 3 and 4 again, the tab protection module 400 may further include a lead slot 430 through which the electrode lead 300 passes. The lead slot 430 may be formed at a front side of the tab protection module 400.

Specifically, when the first protection cap 410 and the second protection cap 420 are coupled to each other, if viewed from the front of the tab protection module 400, an opening space of a predetermined size may be formed between the first protection cap 410 and the second protection cap 420 in the upper and lower direction. The lead slot 430 may correspond to the opening space of a predetermined size formed when the first protection cap 410 and the second protection cap 420 are assembled in this way. In other words, the lead slot 430 may be a space defined between the first protection cap 410 and the second protection cap 420, the spaced sized and shaped to receive the electrode lead 300. Thus, after the electrode assembly 100 is assembled with the tab protection module 400 and the electrode lead 300, the first protection cap 410 is disposed on a first (e.g., upper) side of the electrode lead 300 and the second protection cap 420 is disposed on a second (e.g., lower) side of the electrode lead 300.

According to this embodiment, it is possible to prevent the electrode lead 300 from being damaged and to minimize the occurrence of a short circuit in the electrode lead 300.

Figure 7:
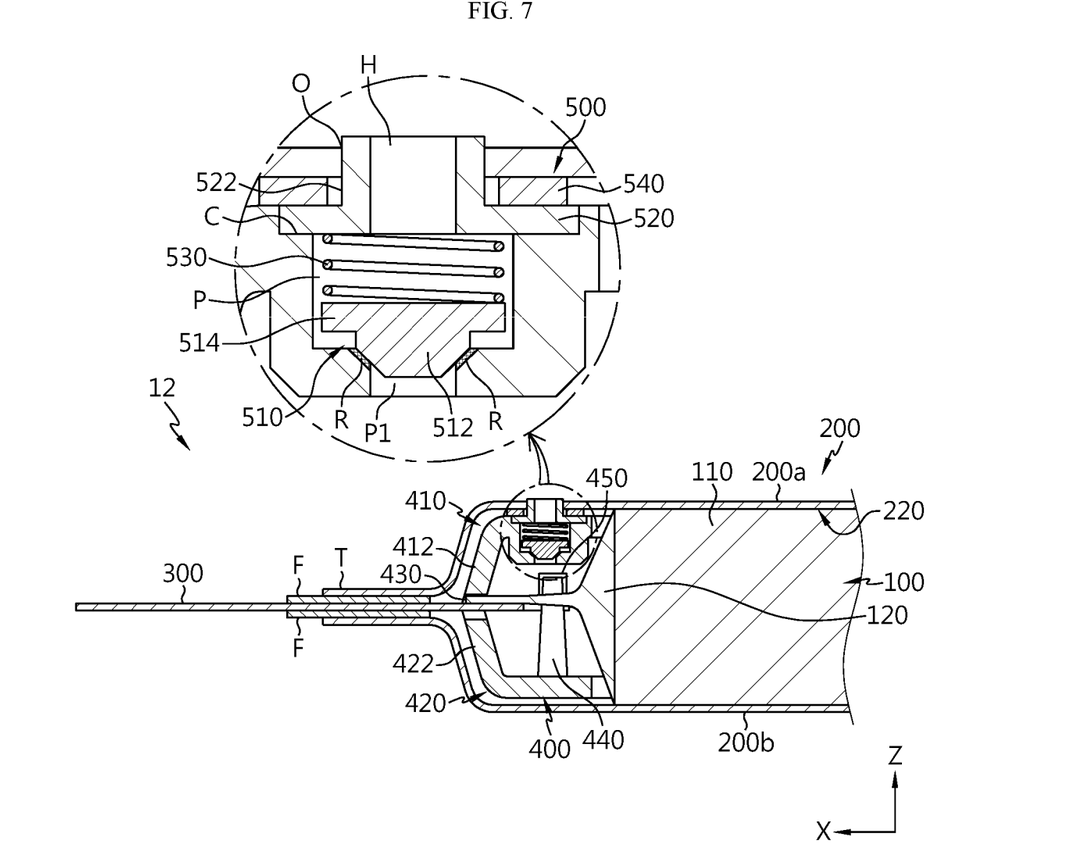
FIG. 7 is a diagram showing a battery cell according to the second embodiment of the present disclosure.

FIG. 7 is a diagram showing a battery cell 12 according to the second embodiment of the present disclosure.

Since the battery cell 12 according to this embodiment is similar to the battery cell of the former embodiment, components substantially identical or similar to those of the former embodiment will not be described again, and features different from those of the former embodiment will be described in detail.

Referring to FIG. 7, in the battery cell 12 according to this embodiment, the venting module 500 may further include a buffer member R. As an example, the buffer member R may be made of a material such as rubber, silicone or urethane, but is not limited thereto.

The buffer member R is provided at an inlet of the venting passage P (a region of the venting passage P facing the inside of the cell case 200), and may be configured to contact the valve 510 when the internal pressure of the cell case 200 decreases.

In the battery cell 12 according to this embodiment, a part of the communication hole P1 in contact with the first portion 512 of the valve 510 may be formed in a tapered shape. In addition, a part of the first portion 512 in contact with the tapered portion of the communication hole P1 may be formed in a tapered shape. Also, the buffer member R may be provided on the part of the communication hole P1 formed in a tapered shape.

The buffer member R may come into contact with the first portion 512 of the valve 510 when the venting gas is discharged to the outside of the cell case 200 so that the internal pressure of the cell case 200 is lowered below a threshold pressure. Accordingly, even when the valve 510 closes the venting passage P as the internal pressure of the cell case 200 is lowered below the threshold pressure, damage to the valve 510 may be minimized.

In addition, one or more battery cells 10, 12 according to the present disclosure may be provided to constitute a battery module. That is, the battery module according to the present disclosure may include one or more battery cells 10, 12 according to the present disclosure. Specifically, one or more battery cells 10, 12 may constitute a cell assembly, and the cell assembly may be accommodated in a module case.

In addition, at least one battery module according to the present disclosure may be provided to configure the battery pack. That is, the battery pack according to the present disclosure may include at least one battery module according to the present disclosure. In addition, the battery pack may further include a pack case for accommodating the battery module therein and various devices for controlling the charging and discharging of the battery pack, for example a battery management system (BMS), a current sensor and a fuse.

In addition, the battery pack according to the present disclosure may be applied to a vehicle, such as an electric vehicle. That is, the vehicle according to the present disclosure may include at least one battery pack according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms indicating directions such as "upper", "lower", "left", "right", "front" and "rear" are used herein, these terms are selected just for convenience of description only, and it is obvious to those skilled in the art that these terms may change depending on the position of the stated element or an observer.

REFERENCE SIGNS

12: battery cell
100: electrode assembly
110: cell body
120: electrode tab
200: cell case
O: venting hole
300: electrode lead
400: tab protection module
P: venting passage
C: seating groove
500: venting module
510: valve
520: support member
522: venting guide unit
H: hole
524: coupling hole
530: elastic member
540: sealing member
R: buffer member
B: coupling member

What is claimed is:

1. A battery cell, comprising:
an electrode assembly including a cell body and an electrode tab provided to at least one of both sides of the cell body;
a cell case including an accommodation portion configured to accommodate the electrode assembly therein, a sealing portion having a shape extending outward by a predetermined length from a periphery of the accommodation portion, and a venting hole formed in the accommodation portion;
an electrode lead drawn out of the cell case by a predetermined length and connected to the electrode assembly through the electrode tab;
a tab protection module accommodated in the cell case and configured to cover at least a portion of the electrode tab between the cell body and the sealing portion and having a venting passage configured to communicate with the venting hole, the venting passage being spaced from the electrode lead; and
a venting module coupled to the tab protection module, provided in the venting passage and configured to guide a venting gas to be discharged out of the cell case by opening the venting passage from an inner space surrounded by the tab protection module and the cell body as an internal pressure of the cell case increases.

2. The battery cell according to claim 1,
wherein the venting module is configured to open and close communication between the venting passage and the venting hole according to a change in the internal pressure of the cell case.

3. The battery cell according to claim 2,
wherein the venting module includes:
a valve configured to open or close the venting passage according to the change in the internal pressure of the cell case;
a support member including a venting guide unit having a hole provided at a location corresponding to the venting passage and the venting hole; and
an elastic member disposed between the valve and the support member in an elastically compressed state.

4. The battery cell according to claim 3,
wherein the venting guide unit is configured to at least partially protrude out of the cell case through the venting hole.

5. The battery cell according to claim 3,
wherein the venting module further includes a sealing member disposed between an inner surface of the cell case and the support member, the sealing member being configured to seal a space between the venting guide unit and the venting hole.

6. The battery cell according to claim 5,
wherein the sealing member is configured to surround an outer circumference of the venting guide unit.

7. The battery cell according to claim 3,
wherein the tab protection module includes a seating groove at which the support member is disposed.

8. The battery cell according to claim 3,
wherein the support member includes a coupling hole configured to be coupled to the tab protection module with a coupling member.

9. The battery cell according to claim 3,
wherein the venting module further includes a buffer member provided at an inlet of the venting passage and configured to contact the valve when the internal pressure of the cell case decreases.

10. The battery cell according to claim 1,
wherein the tab protection module is configured to have a shape corresponding to an inner surface of the cell case facing the tab protection module.

11. The battery cell according to claim 1,
wherein a coupling portion coupling the electrode tab and the electrode lead is located in an inner space of the tab protection module.

12. The battery cell according to claim 1,
wherein at least a portion of the tab protection module is in close contact with the cell body.

13. The battery cell according to claim 1,
wherein the tab protection module is disposed between an inner surface of the cell case and the electrode assembly,
wherein a first end of the tab protection module is positioned at a first side of the electrode assembly,
a second end of the tab protection module is positioned at a coupling portion coupling the electrode tab and the electrode lead, and
the electrode tab is configured to be at least partially surrounded by the tab protection module between the first end of the tab protection module and the second end of the tab protection module.

14. The battery cell according to claim 1, wherein the tab protection module is provided on at least one side of the cell body and configured to at least partially cover an upper side and a lower side of the electrode tab.

15. A battery module, comprising at least one battery cell according to claim 1.

16. A battery pack, comprising at least one battery module according to claim 15.

17. A vehicle, comprising at least one battery pack according to claim 16.

18. A battery cell, comprising:
an electrode assembly including a cell body and an electrode tab provided to at least one of both sides of the cell body;
a cell case including an accommodation portion configured to accommodate the electrode assembly therein, a sealing portion having a shape extending outward by a predetermined length from a periphery of the accommodation portion, and a venting hole formed in the accommodation portion;
an electrode lead drawn out of the cell case by a predetermined length and connected to the electrode assembly through the electrode tab;
a tab protection module accommodated in the cell case and configured to cover at least a portion of the electrode tab between the cell body and the sealing portion and having a venting passage configured to communicate with the venting hole; and
a venting module coupled to the tab protection module and including an elastic member, the venting module provided in the venting passage and configured to guide a venting gas to be discharged out of the cell case by opening the venting passage from an inner space surrounded by the tab protection module and the cell body as an internal pressure of the cell case increases.

* * * * *